United States Patent [19]

Henderson et al.

[11] 3,896,183

[45] July 22, 1975

[54] PROCESS FOR THE LIQUID PHASE CHLORINATION OF C6–C18 ALPHA-OLEFIN HYDROCARBONS

[75] Inventors: Albert J. Henderson, Corapolis; John E. Krol, Moon Twp., both of Pa.

[73] Assignee: Neville Chemical Company, Pittsburgh, Pa.

[22] Filed: Mar. 11, 1974

[21] Appl. No.: 449,756

[52] U.S. Cl............................. 260/660; 204/163 R
[51] Int. Cl............................................. C07c 17/06
[58] Field of Search................. 260/660; 204/163 R

[56] References Cited
UNITED STATES PATENTS
1,129,165  2/1915  Buchner.............................. 260/660
3,338,982  8/1967  Leach et al......................... 260/660

*Primary Examiner*—Delbert E. Gantz
*Assistant Examiner*—Joseph A. Boska
*Attorney, Agent, or Firm*—Burns, Doane, Swecker & Mathis

[57] ABSTRACT

An improved process for the liquid phase chlorination of a normally liquid hydrocarbon mixture is provided which is capable of yielding a product of enhanced quality through the elimination of an undesirable side reaction in the gaseous mixture which is in contact with the liquid mass where the desired chlorination reaction is carried out. The hydrocarbon feed contains on the average 6 to 18 carbon atoms per molecule and consists mainly of normal alpha-olefins. A minor quantity of an additive (e.g. carbon tetrachloride) is provided in the reaction zone and is at least partially present in the gaseous mixture where an undesirable reaction between hydrocarbon vapor and gaseous chlorine is eliminated. An improved chlorinated hydrocarbon product is formed in the reaction zone.

15 Claims, No Drawings

PROCESS FOR THE LIQUID PHASE CHLORINATION OF C6-C18 ALPHA-OLEFIN HYDROCARBONS

BACKGROUND OF THE INVENTION

The chlorination of normally liquid alpha-olefin hydrocarbon mixtures, e.g. mixtures of those olefinic hydrocarbons containing 6 to 18 carbon atoms per molecule has been suggested in the past. Such chlorination has been conducted by introducing chlorine into a reaction zone containing the liquid alpha-olefin hydrocarbon mixture until the desired degree of chlorination has been achieved. A Lewis acid catalyst may be provided. Generally, it has not been the practice to dissolve a normally liquid hydrocarbon mixture in a solvent for the same prior to such chlorination as commonly is practiced when a higher molecular weight paraffin or alpha-olefin hydrocarbon mixture which is normally a solid at room temperature is chlorinated, e.g. a wax-like mixture of hydrocarbons containing an average of 20 to 26 (or more) carbon atoms per molecule.

As substantial quantities of liquid alpha-olefins become readily available, primarily because of demands presented by the detergent industry, this material is being increasingly looked to as a potential precursor for use in the production of chlorinated hydrocarbons.

Chlorinated paraffin hydrocarbons containing an average of 6 to 18 carbon atoms per molecule find utility in a variety of industrial applications. Those chlorinated hydrocarbons containing about 40 to 73 percent chlorine by weight may serve as plasticizers for paints, plastics, and rubber compounds, fire retardant coatings, etc. Those chlorinated hydrocarbons which are chlorinated to a lesser degree are useful as intermediates in the production of detergents.

In recent years increasing effort has been directed to attempting to improve the quality of the chlorinated hydrocarbon product. For instance, color often is of prime importance in many end use applications, e.g. in the formulation of light colored paints, etc.

Chlorinated hydrocarbons containing an average of 6 to 18 carbon atoms per molecule which are derived from a liquid alpha-olefin feed may be observed to include coloration and exhibit less than a water white color, i.e. the product may be yellow or brown in appearance. Also, spontaneous exothermic reactions may occur in the chlorination reaction zone above the liquid mass undergoing chlorination which are accompanied by a flash of light, e.g. a blue flame. Dark particles then may be observed in the chlorinated hydrocarbon product.

It is an object of the invention to provide an improved process for the liquid phase chlorination of a hydrocarbon mixture consisting mainly of normal alpha-olefins which is a liquid at room temperature and contains on the average 6 to 18 carbon atoms per molecule.

It is an object of the invention to provide an improved process for the liquid phase chlorination of an alpha-olefin containing hydrocarbon mixture having on the average 6 to 18 carbon atoms per molecule which yields a product of improved quality.

It is an object of the invention to provide an improved process for the liquid phase chlorination of an alpha-olefin hydrocarbon mixture containing on the average 6 to 18 carbon atoms per molecule which yields a product of improved color.

It is an object of the invention to provide an improved process for the liquid phase chlorination of an alpha-olefin hydrocarbon mixture containing on the average 6 to 18 carbon atoms per molecule which is economical in operation.

It is an object of the invention to provide an improved process for the liquid phase chlorination of an alpha-olefin hydrocarbon mixture containing on the average 6 to 18 carbon atoms per molecule which is conducted both in the absence of a Lewis acid catalyst and a conventional solvent.

It is another object of the invention to provide an improved process for the liquid phase chlorination of an alpha-olefin hydrocarbon mixture containing on the average 6 to 18 carbon atoms per molecule which eliminates a deleterious side reaction in the gaseous mixture which is in contact with the liquid mass where the desired chlorination reaction is carried out.

It is a further object of the invention to provide an improved process for the liquid phase chlorination of an alpha-olefin hydrocarbon mixture containing on the average 6 to 18 carbon atoms per molecule which may be expeditiously carried out in a readily controllable manner.

It is another object of the invention to provide an improved process for the liquid phase chlorination of an alpha-olefin hydrocarbon mixture containing on the average 6 to 18 carbon atoms per molecule which may be instantaneously initiated in the absence of a chlorination induction period.

These and other objects and advantages of the improved process, as well as its scope, nature, and utilization will be apparent to those skilled in the art from the following description and appended claims.

SUMMARY OF THE INVENTION

It has been found that an improved process for the production of a chlorinated hydrocarbon containing about 20 to 73 percent chlorine by weight comprises chlorinating a hydrocarbon mixture which is a liquid at room temperature containing on the average 6 to 18 carbon atoms per molecule and consisting mainly of normal alpha-olefins while present in the liquid state at a temperature of about 25° to 120°C. in a reaction zone wherein a gaseous mixture comprising a minor proportion of the hydrocarbon vapor and gaseous chlorine exists in contact with the liquid hydrocarbon during at least a portion of the chlorination reaction while providing in the reaction zone about 2 to 20 percent by weight based upon the weight of the hydrocarbon mixture of an additive selected from the group consisting of carbon tetrachloride, chloroform, ethylene dichloride, 1,1,1-trichloroethane, 1,1,2-trichloroethane, and perchloroethane and with no solvent for the hydrocarbon mixture being present in the reaction zone other than the minor concentration of the additive which primarily serves a role other than a solvent and which is at least partially volatilized and present in the gaseous mixture in contact with the liquid hydrocarbon where it serves to eliminate an undesirable reaction between the hydrocarbon vapor and the gaseous chlorine thereby improving the quality of the resulting chlorinated hydrocarbon product, and thereafter substantially removing the additive from the chlorinated hydrocarbon product.

In a particularly preferred embodiment of the process the additive is carbon tetrachloride which is provided in the reaction zone in a concentration of about 5 to 10 percent by weight based upon the weight of the hydrocarbon mixture.

DESCRIPTION OF PREFERRED EMBODIMENTS

The hydrocarbon mixture which is chlorinated in accordance with the present process may be natural or synthetic in origin and is a liquid at room temperature (i.e. ambient conditions at 25°C.). The hydrocarbon mixture contains on the average 6 to 18 carbon atoms per molecule and consists mainly of normal alpha-olefins. The term "alpha-olefin" as used herein designates the presence of a double bond within the hydrocarbon molecule at a position intermediate a terminal carbon atom and the next carbon atom adjacent thereto. The hydrocarbon molecules are preferably mono-olefinic in nature; however, a minor proportion of substantially straight chain diolefinic hydrocarbon molecules optionally may be present (e.g. up to about 40 percent by weight diolefins and most preferably not exceeding 10 percent by weight diolefins). The alpha-olefin feed is preferably substantially free of deleterious impurities, and may be selected from among those alpha-olefin feeds commonly employed in the production of synthetic detergents. In a particularly preferred embodiment of the process the hydrocarbon mixture which serves as the feed contains on the average 11 to 14 carbon atoms per molecule. The hydrocarbon mixture may optionally include a minor concentration of saturated paraffin hydrocarbons in admixture with the alpha-olefin feed (e.g. up to about 40 percent by weight paraffin hydrocarbons). It is preferred that any paraffin hydrocarbons added to the alpha-olefin admixture contain at least 90 percent normal paraffin hydrocarbons by weight, and in a particularly preferred embodiment of the process at least 95 percent normal paraffin hydrocarbons by weight. The higher the normal paraffin content of any paraffin hydrocarbons introduced into the feed the lighter the color and the higher the stability of the chlorinated product which is achievable. The aromatic, branched paraffin, branched olefin, and oxidized hydrocarbon content of the feed preferably is minimized. If desired, conventional molecular sieve techniques may be employed to obtain a feed of the preferred composition.

The liquid hydrocarbon mixture as discussed above which is chlorinated in accordance with the present process may optionally include a minor quantity of dissolved higher molecular weight hydrocarbons which contain in excess of 18 carbon atoms per molecule (e.g. 19 to 35 carbon atoms per molecule) provided the resulting hydrocarbon mixture consists mainly (i.e. more than 50 percent by weight) of normal alpha-olefins, contains an average of 6 to 18 carbon atoms per molecule, and is a homogeneous liquid at room temperature (i.e. ambient conditions at 25°C.). For instance, a minor quantity of a normally solid hydrocarbon which is either an alpha-olefin or a saturated paraffinic hydrocarbon may be incorporated in the liquid hydrocarbon feed (e.g. a common wax-like hydrocarbon mixture of 20 to 26 carbon atoms per molecule or 24 to 28 carbon atoms per molecule).

Illustrative examples of preferred liquid hydrocarbon feeds for use in the present invention are summarized below:

Representative Hydrocarbon Feed A

| | |
|---|---|
| Percent normal mono-alpha-olefins by weight | 93% |
| Percent diolefins by weight | 4% |
| Percent paraffin hydrocarbons by weight | 3% |
| $C_5$ hydrocarbons by weight | 2% |
| $C_6$ hydrocarbons by weight | 39% |
| $C_7$ hydrocarbons by weight | 24% |
| $C_8$ hydrocarbons by weight | 17% |
| $C_9$ hydrocarbons by weight | 16% |
| $C_{10}$ hydrocarbons by weight | 2% |
| Average carbon atoms per molecule | 7.12 |
| Average molecular weight per molecule | 100 |
| Boiling range, ASTM D-86 at 760mm.Hg (5–95% off) | 72–140°C. |
| Density 20°C./4°C.g./ml. | 0.713 |
| Bromine number g./100g. | 165 |
| Saybolt color | +30 |

Representative Hydrocarbon Feed B

| | |
|---|---|
| Percent normal mono-alpha-olefins by weight | 94% |
| Percent diolefins by weight | 5% |
| Percent paraffin hydrocarbons by weight | 1% |
| $C_{10}$ hydrocarbons by weight | 1% |
| $C_{11}$ hydrocarbons by weight | 27% |
| $C_{12}$ hydrocarbons by weight | 24% |
| $C_{13}$ hydrocarbons by weight | 24% |
| $C_{14}$ hydrocarbons by weight | 23% |
| $C_{15}$ hydrocarbons by weight | 1% |
| Average carbon atoms per molecule | 12.44 |
| Average molecular weight per molecule | 174 |
| Boiling range, ASTM D-1160 at 10mm. Hg | 76–124°C. |
| Density 20°C./4°C.g./ml. | 0.770 |
| Bromine number g./100g. | 98 |
| Saybolt color | +30 |

Representative Hydrocarbon Feed C

| | |
|---|---|
| Percent Normal mono-alpha-olefins by weight | 91% |
| Percent diolefins by weight | 7% |
| Percent paraffin hydrocarbons by weight | 2% |
| $C_{14}$ hydrocarbons by weight | 1% |
| $C_{15}$ hydrocarbons by weight | 29% |
| $C_{16}$ hydrocarbons by weight | 28% |
| $C_{17}$ hydrocarbons by weight | 27% |
| $C_{18}$ hydrocarbons by weight | 14% |
| $C_{19}$ hydrocarbons by weight | 1% |
| Average carbon atoms per molecule | 16.27 |
| Average molecular weight per molecule | 228 |
| Boiling range, ASTM D-1160 at 10mm. Hg | 193–321°C. |
| Density 20°C./4°C. g./ml. | 0.783 |
| Bromine number g./100 g. | 73 |
| Saybolt color | +30 |

Representative Hydrocarbon Feed D

| | |
|---|---|
| Percent normal mono-alpha-olefins by weight | 97% |
| Percent non-alpha mono-olefins by weight | 1.6% |
| Percent paraffin hydrocarbons by weight | 1.4% |
| $C_6$ hydrocarbons by weight | 99.8% |
| Below $C_4$ and above $C_8$ hydrocarbons by weight | 0.1% |
| Average carbon atoms per molecule | 6 |
| Average molecular weight per molecule | 84 |
| Boiling range, ASTM D-1078 (5–95% off) | 60–66°C. |
| Density 60°/60°F. g./100g. | 0.678 |
| Bromine number g./100g. | 194 |
| Saybolt color | +30 |

Representative Hydrocarbon Feed E

| | |
|---|---|
| Percent normal mono-alpha-olefins by weight | 96.1% |
| Percent non-alpha mono-olefins by weight | 2.5% |
| Percent paraffin hydrocarbons by weight | 1.4% |
| $C_8$ hydrocarbons by weight | 99.7% |
| Average carbon atoms per molecule | 8 |
| Average molecular weight per molecule | 112 |
| Boiling range, ASTM D-1078 (5–95% off) | 118–128°C. |
| Density 60°/60°F. g./ml. | 0.719 |
| Bromine number g./100g. | 146 |
| Saybolt color | +30 |

Representative Hydrocarbon Feed F

| | |
|---|---|
| Percent normal mono-alpha-olefins by weight | 95.2% |
| Percent non-alpha mono-olefins by weight | 3.4% |
| Percent paraffin hydrocarbons by weight | 1.4% |
| $C_{10}$ hydrocarbons by weight | 99.4% |
| Average carbon atoms per molecule | 10 |
| Average molecular weight per molecule | 140 |
| Boiling range, ASTM D-1078 (5–95% off) | 164–175°C. |
| Density 60°/60°F. g./ml. | 0.745 |
| Bromine number g./100 g. | 118 |
| Saybolt color | +30 |

Representative Hydrocarbon Feed G

| | |
|---|---|
| Percent normal mono-alpha-olefins by weight | 94% |
| Percent non-alpha mono-olefins by weight | 4.6% |
| Percent paraffin hydrocarbons by weight | 1.4% |
| $C_{12}$ hydrocarbons by weight | 99.3% |
| Average carbon atoms per molecule | 12 |
| Average molecular weight per molecule | 168 |
| Boiling range, ASTM D-1078 (5–95% off) | 205–220°C. |
| Density 60°/60°F. g./ml. | 0.763 |
| Bromine number g./100g. | 98 |
| Saybolt color | +30 |

Representative Hydrocarbon Feed H

| | |
|---|---|
| Percent normal mono-alpha-olefins by weight | 93% |
| Percent non-alpha mono-olefins by weight | 5.6% |
| Percent paraffin hydrocarbons by weight | 1.4% |
| $C_{14}$ hydrocarbons by weight | 98.9% |
| Average carbon number per molecule | 14 |
| Average molecular weight per molecule | 196 |
| Boiling range, ASTM D-1078 (5–95% off) | 240–255°C. |
| Density 60°/60°F. g./ml. | 0.776 |
| Bromine number g./100g. | 84 |
| Saybolt color | +30 |

Representative Hydrocarbon Feed I

| | |
|---|---|
| Percent mono-alpha-olefins by weight | 92% |
| Percent non-alpha mono-olefins by weight | 6.6% |
| Percent paraffin hydrocarbons by weight | 1.4% |
| $C_{16}$ hydrocarbons by weight | 98.5% |
| Average carbon number per molecule | 16 |
| Average molecular weight per molecule | 224 |
| Boiling range, ASTM D-1078 (5–95% off) | 270–300°C. |
| Density 60°/60°F. g./ml. | 0.785 |
| Bromine number g./100g. | 74 |
| Saybolt color | +30 |

Representative Hydrocarbon Feed J

| | |
|---|---|
| Percent mono-alpha-olefins by weight | 90.8% |
| Percent non-alpha mono-olefins by weight | 7.8% |
| Percent paraffin hydrocarbons by weight | 1.4% |
| $C_{18}$ hydrocarbons by weight | 98% |
| Average carbon number per molecule | 18 |
| Average molecular weight per molecule | 252 |
| Freezing Point, ASTM D-1015 | 18°C. |
| Density, ASTM D-1298 at 60°F. (theoretical) | 0.792 |
| Bromine number g./100g. | 65 |
| Saybolt color | +30 |

The improved process of the present invention is carried out by providing in the reaction zone about 2 to 20 percent by weight based upon the weight of hydrocarbon mixture of an additive selected from the group consisting of carbon tetrachloride, chloroform, ethylene dichloride, 1,1,1-trichloroethane, 1,1,2-trichloroethane, and perchloroethane during the chlorination reaction. The additive is preferably provided in a concentration of about 5 to 10 percent by weight based upon the weight of the hydrocarbon mixture. The particularly preferred additive for use in the process is carbon tetrachloride. The additive is preferably introduced into the reaction zone prior to the commencement of the chlorination reaction and is dissolved in the hydrocarbon mixture.

The chlorination reaction is carried out with the hydrocarbon mixture in the liquid state and preferably at a temperature of about 25° to 120°C., and most preferably at a temperature of about 70° to 110°C. Chlorine is reacted with the alpha-olefin hydrocarbon by way of addition and substitution reactions with hydrogen chloride being formed in the latter reaction as a by-product. If desired, the chlorination reaction initially may be carried out at a temperature of about 25° to 65°C. and subsequently elevated to about 90° to 110°C. during the latter stages of the reaction. The chlorination is preferably carried out at substantially atmospheric pressure; however, slightly elevated pressures may be utilized. Chlorine preferably continuously is introduced into the liquid hydrocarbon mixture as a gas. The rate of chlorine introduction is preferably adjusted so as to approximate the rate of reaction attainable, and can be decreased should the rate of reaction become excessive. A slight excess of chlorine, e.g. 5 to 15 percent excess by weight, is usually introduced. The liquid hydrocarbon undergoing chlorination is preferably stirred or otherwise agitated throughout the reaction. The flow of chlorine through the liquid hydrocarbon aids in the volatilization of the additive.

A gaseous mixture comprising a minor portion of hydrocarbon vapor, gaseous chlorine, and the additive exists in contact with the liquid hydrocarbon during at least the initial portion of the chlorination reaction. As discussed hereafter, the role of the minor quantity of additive in the reaction zone is believed to be primarily other than that of a typical solvent role. No solvent is present in the reaction zone in the conventional sense. The product capacity of the reaction zone is accordingly increased and product recovery techniques are simplified. The chlorination reaction is carried out in the absence of a Lewis acid catalyst.

While it is possible to catalyze the chlorination reaction with a conventional actinic light source, entirely satisfactory reactions are carried out in the absence of light. If a light source is utilized during the latter portion of the chlorination reaction, then a correspondingly lower chlorination temperature may be selected.

If desired, an additive capable of overcoming trace amounts of iron contamination optionally may be provided in the reaction zone in accordance with the teachings of our commonly assigned U.S. Pat. No. 3,567,610 which is herein incorporated by reference.

The improved process of the present invention is capable of producing chlorinated hydrocarbon products having varying degrees of chlorination. The chlorination reaction may be terminated, e.g. by ceasing chlorine introduction when the desired degree of chlorination has taken place. The progress of the chlorination reaction may be simply monitored, e.g. by the periodic withdrawal of a sample followed by a specific gravity determination. The process may be utilized in the formation of a chlorinated hydrocarbon product containing about 20 to 73 percent chlorine by weight. In a preferred embodiment of the process a chlorinated hydrocarbon is formed having about 40 to 70 percent chlorine by weight, e.g. about 50 to 70 percent chlorine by weight. The chlorinated product may be either a free flowing liquid or a viscous liquid at ambient conditions depending upon its chain length and degree of chlorination.

In a particularly preferred embodiment of the process chlorinated hydrocarbon containing about 40 to 70 percent chlorine by weight is produced by chlorinating in the absence of a Lewis acid catalyst a hydrocarbon mixture which is a liquid at room temperature containing on the average 6 to 18 carbon atoms per molecule and consisting mainly of normal alpha-olefins while present in the liquid state at a temperature of about 25° to 120°C. in a reaction zone wherein a gaseous mixture comprising a minor proportion of hydrocarbon vapor and gaseous chlorine exists in contact with the liquid hydrocarbon during at least a portion of the chlorination reaction while providing in the reaction zone about 5 to 10 percent by weight based upon the weight of the hydrocarbon mixture of carbon tetrachloride additive, and with no solvent for the hydrocarbon mixture being present in the reaction zone other than the additive, with the additive being at least partially volatilized and present in the gaseous mixture in contact with the liquid hydrocarbon where it serves to eliminate an undesirable reaction between the hydrocarbon vapor and the gaseous chlorine thereby improving the quality of the resulting chlorinated hydrocarbon product, and substantially removing the additive from the chlorinated hydrocarbon product.

The following chlorination periods are generally encountered when practicing the above embodiment of the process in the absence of light catalysis to reach the desired degree of chlorination:

| Weight Percent Chlorine in Chlorinated Hydrocarbon | Time in Hours |
| --- | --- |
| 40 | 7 to 10 |
| 50 | 11 to 15 |
| 60 | 22 to 33 |
| 70 | 26 to 40 |

Conventional apparatus commonly utilized in the chlorination of paraffin hydrocarbons may be selected for use in the process which are provided with means for continuous or intermittent introduction of chlorine into the liquid hydrocarbon. Such reaction zones are preferably glass lined. Means are preferably also provided for the refluxing of the additive during the chlorination reaction. For instance, a condenser may be provided in conjunction with the reaction zone where vaporized additive is condensed to a liquid and allowed to flow back to the reaction zone. A jacket and/or cooling coils may also be provided about the reaction zone which may be utilized to bring the liquid hydrocarbon mixture to the desired chlorination temperature and to aid in the maintenance of a relatively constant temperature within the reaction zone after the chlorination reaction has begun.

At the completion of the chlorination standard techniques may be employed to recover the chlorinated hydrocarbon of a relatively high degree of purity. For instance, air or other gas may be blown through the chlorinated product mixture to remove unreacted chlorine, remaining additive, and remaining hydrogen chloride by-product resulting from the replacement reaction. Also vacuum distillation techniques may be utilized to improve the purity of the product. Conventional stabilizers next optionally may be added to the chlorinated paraffin hydrocarbon product.

The theory whereby the liquid phase chlorination of a hydrocarbon mixture containing on the average 6 to 18 carbon atoms per molecule and consisting mainly of normal alpha-olefins in the presence of a small amount of the additives recited serves to produce substantially improved results is considered complex and incapable of simple explanation. The advantages made possible through the inclusion of the minor concentration of the additive may be traced to a large degree to the elimination of an undesirable side reaction in the gaseous mixture which is in contact with the liquid mass where the desired chlorination reaction is carried out. The presence of volatilized additive (e.g. carbon tetrachloride) in the gaseous mixture serves to eliminate a degradative exothermic reaction in the gaseous phase between evolved hydrocarbon vapors and gaseous chlorine. Such a reaction particularly is prone to occur during the initial stages of the chlorination reaction when there exists a substantial quantity of non-chlorinated hydrocarbon vapor adjacent the liquid mass. The additives utilized in the present process accordingly serve to prevent a product quality impairing degradative reaction within the reaction zone. Flash flames, carbonization, and chlorinolysis reactions are accordingly eliminated, as are the dark product quality impairing by-products of such degradative reactions. Dark particles and dark sludge are absent in the chlorinated hydrocarbon product.

It has been found that significant advantages reside in the utilization of a liquid hydrocarbon feed which consists mainly of normal alpha-olefins. Unlike results obtained with a normal paraffin hydrocarbon feed, the chlorination reaction requires no induction period and proceeds at a temperature as low as 25°C. in a smooth and instantaneous manner with a lesser need for exotherm control. The overall chlorination time is reduced, and a lesser quantity of chlorine is required to reach a given level of chlorination in the product since a portion of the chlorine is introduced by an addition reaction and not a substitution reaction with hydrogen chloride formation.

The following examples are given as specific illustrations of the invention. It should be understood, however, that the invention is not limited to the specific details set forth in the examples.

EXAMPLE I

A liquid hydrocarbon feed containing on the average 7.12 carbon atoms per molecule and consisting mainly of alpha-olefins as described in the preceding Representative Hydrocarbon Feed A is selected as the hydrocarbon reactant. About 7,800 parts by weight of the liquid hydrocarbon feed are charged to a conventional glass lined reaction vessel. About 780 parts by weight of carbon tetrachloride additive are charged to the reaction vessel. The contents of the reaction vessel are initially provided at 25°C. A stirrer is provided within the reaction vessel and its contents continuously are agitated. Situated above the reaction vessel is a condenser where volatilized carbon tetrachloride is condensed and caused to flow back to the reaction vessel. Gaseous chlorine continuously is introduced at the bottom of the reaction vessel whereupon the chlorination reaction immediately begins. As the reaction proceeds the contents of the reaction zone gradually are elevated from 25°C. to a temperature of 95°C. over a period of 6 hours. A heat exchange medium is circulated in the jacket of the reaction vessel to maintain the contents of the reaction vessel at 95° C. throughout the remainder of the chlorination reaction. The chlorination reaction is carried out in the absence of light catalysis. Chlorine gas is introduced at a rate of about 5 to 15 percent in excess of that undergoing reaction. The chlorine gas is initially introduced into the reaction vessel at a rate of about 200 parts by weight per hour, and this rate is subsequently increased to about 900 parts by weight per hour. Over a period of 24 hours about 18,300 parts by weight of chlorine are introduced into the reaction vessel, and the chlorination reaction subsequently is terminated. The contents of the reaction vessel are provided substantially at atmospheric pressure throughout the process. During the chlorination reaction hydrogen chloride gas is passed through the condenser and is collected, as is excess chlorine. The liquid reaction product is cooled and air blown to remove chlorine gas and carbon tetrachloride additive. It is determined that about 19,500 parts by weight of liquid chlorinated hydrocarbon product are produced.

During the chlorination reaction a gaseous mixture which includes gaseous chlorine, volatilized hydrocarbons, and carbon tetrachloride, is present within the reaction vessel in contact with the liquid mass undergoing reaction. There is no indication that an undesirable degradative reaction takes place in this gaseous mixture. The resulting liquid chlorinated hydrocarbon product contains about 60 percent chlorine by weight and is near water white in color.

When the chlorination reaction is repeated in the absence of the carbon tetrachlorine additive, a product color impairing degradative reaction occurs in the gaseous mixture in contact with the mass undergoing reaction which involves a reaction of gaseous chlorine and volatilized hydrocarbons.

EXAMPLE II

Example I may be repeated while substituting a chloroform additive for the carbon tetrachloride additive to obtain similar results.

EXAMPLE III

Example I may be repeated while substituting an ethylene dichloride additive for the carbon tetrachloride additive to obtain similar results.

EXAMPLE IV

Example I may be repeated while substituting a 1,1,1-trichloroethane additive for the carbon tetrachloride additive to obtain similar results.

EXAMPLE V

Example I may be repeated while substituting a 1,1,2-trichloroethane additive for the carbon tetrachloride additive to obtain similar results.

EXAMPLE VI

Example I may be repeated while substituting a perchloroethane additive for the carbon tetrachloride additive to obtain similar results.

EXAMPLE VII

To further illustrate the present invention Example I is repeated with the following exceptions. About 5,800 parts by weight of hydrocarbon feed containing on the average 12.44 carbon atoms per molecule and consisting mainly of alpha-olefins as described in the preceding Representative Hydrocarbon Feed B, and about 700 parts by weight of carbon tetrachloride are charged to the reaction vessel. Chlorine is initially introduced at a rate of about 400 parts by weight per hour, and subsequently at a rate of about 900 parts by weight per hour. A total of about 23,100 parts by weight of chlorine are introduced into the reaction vessel over a period of 30 hours. There is no indication that an undesirable degradative reaction takes place in the gaseous mixture. It is determined that about 18,125 parts by weight of chlorinated hydrocarbon product are produced.

The resulting liquid chlorinated hydrocarbon product contains about 68 percent chlorine by weight and is near water white in color.

When the chlorination reaction is repeated in the absence of the carbon tetrachloride additive, a product color impairing degradative reaction occurs in the gaseous mixture in contact with the mass undergoing reaction which involves a reaction of gaseous chlorine and volatilized hydrocarbons.

EXAMPLE VIII

To further illustrate the invention Example I is repeated with the following exceptions. About 6,500 parts by weight of hydrocarbon feed containing on the average 12 carbon atoms per molecule and consisting mainly of alpha-olefins as described in the preceding Representative Hydrocarbon Feed G, and about 325 parts by weight of carbon tetrachloride are charged to the reaction vessel. Chlorine is initially introduced at a rate of about 250 parts by weight per hour, and subsequently at a rate of about 1000 parts by weight per hour. A total of about 18,100 parts by weight chlorine are introduced into the reaction vessel over a period of 26 hours. There is no indication that an undesirable degradative reaction takes place in the gaseous mixture. It is determined that about 16,600 parts by weight of chlorinated hydrocarbon product are produced.

The resulting liquid chlorinated hydrocarbon product contains about 61 percent chlorine by weight and is near water white in color.

When the chlorination reaction is repeated in the absence of the carbon tetrachloride additive, a product impairing degradative reaction occurs in the gaseous mixture in contact with the mass undergoing reaction which involves a reaction of gaseous chlorine and volatilized hydrocarbons.

EXAMPLE IX

To further illustrate the invention 1,275 parts by weight of Representative Hydrocarbon Feed B are blended with 200 parts by weight of a normally solid wax-like paraffin hydrocarbon feed as described below, and Example I is repeated with the exceptions indicated.

Description of Solid Paraffin Hydrocarbon Feed Component

| | |
|---|---|
| Carbon atoms per molecule | $C_{20+}$ |
| Average carbon atoms per molecule | 26 |
| Average molecular weight per molecule | 366 |
| Melting point, ASTM D-127 | 129°F. |

The resulting blend is a liquid at ambient conditions and consists mainly of normal alpha-olefins as described below.

Description of Liquid Hydrocarbon Feed Following Blending

| | |
|---|---|
| Percent normal mono-alpha-olefins by weight | 82.1% |
| Percent diolefins by weight | 3.4% |
| Percent paraffin hydrocarbons by weight | 14.4% |
| $C_{10}$ hydrocarbons by weight | 0.9% |
| $C_{11}$ hydrocarbons by weight | 23.3% |
| $C_{12}$ hydrocarbons by weight | 20.8% |
| $C_{13}$ hydrocarbons by weight | 20.7% |
| $C_{14}$ hydrocarbons by weight | 19.9% |
| $C_{15}$ hydrocarbons by weight | 0.9% |
| $C_{20+}$ hydrocarbons by weight | 13.5% |
| Average carbon atoms per molecule | 14.3 |
| Average molecular weight per molecule | 201 |
| Saybolt color | 26+ |

1,475 parts by weight of the resulting liquid hydrocarbon blend as described above, and 125 parts by weight of carbon tetrachloride are charged to the reaction vessel. Chlorine is initially produced at a rate of about 50 parts by weight per hour, and subsequently at a rate of about 125 parts by weight per hour. A total of about 2,869 parts by weight chlorine are introduced into the reaction vessel over a period of 28 hours. There is no indication that an undesirable degradative reaction takes place in the gaseous mixture. It is determined that about 3,075 parts by weight of chlorinated hydrocarbon product are produced.

The resulting liquid chlorinated hydrocarbon product contains about 52 percent chlorine by weight and is near water white in color.

When the chlorination reaction is repeated in the absence of the carbon tetrachloride additive, a product impairing degradative reaction occurs in the gaseous mixture in contact with the mass undergoing reaction which involves a reaction of gaseous chlorine and volatilized hydrocarbon.

EXAMPLE X

To further illustrate the invention 6,100 parts by weight of Representative Hydrocarbon Feed B are blended with 960 parts by weight of a normally solid wax-like alpha-olefin hydrocarbon feed as described below, and Example I is repeated with the exceptions indicated.

Description of Solid Alpha-Olefin Hydrocarbon Feed Component

| | |
|---|---|
| $C_{22}$ hydrocarbons by weight | 0.3% |
| $C_{24}$ hydrocarbons by weight | 28% |
| $C_{26}$ hydrocarbons by weight | 44% |
| $C_{28}$ hydrocarbons by weight | 20% |
| $C_{30+}$ hydrocarbons by weight | 8% |
| Average carbon number per molecule | 26.55 |
| Average molecular weight per molecule | 372 |
| Melting point, ASTM D-127 | 115°F. |

The resulting blend is a liquid at room temperature and consists mainly of normal alpha-olefins as described below.

Description of Liquid Hydrocarbon Feed Following Blending

| | |
|---|---|
| Percent normal mono-alpha-olefins by weight | 94% |
| Percent diolefins by weight | 3.5% |
| Percent paraffin hydrocarbons by weight | 2.4% |
| $C_{10}$ hydrocarbons by weight | 0.9% |
| $C_{11}$ hydrocarbons by weight | 23.3% |
| $C_{12}$ hydrocarbons by weight | 20.7% |
| $C_{13}$ hydrocarbons by weight | 20.7% |
| $C_{14}$ hydrocarbons by weight | 19.9% |
| $C_{15}$ hydrocarbons by weight | 0.9% |
| $C_{22}$ hydrocarbons by weight | 0.048% |
| $C_{24}$ hydrocarbons by weight | 3.8% |
| $C_{26}$ hydrocarbons by weight | 6.0% |
| $C_{28}$ hydrocarbons by weight | 2.7% |
| $C_{30+}$ hydrocarbons by weight | 1.1% |
| Average carbon atoms per molecule | 14.6 |
| Average molecular weight per molecule | 200 |
| Saybolt color | +30 |

7,060 parts by weight of the resulting liquid hydrocarbon blend as described above, and 600 parts by weight of carbon tetrachloride are charged to the reaction vessel. Chlorine initially is introduced at a rate of about 300 parts by weight per hour, and subsequently at a rate of about 1,100 parts by weight per hour. A total of about 13,290 parts by weight chlorine are introduced into the reaction vessel over a period of 20 hours. There is no indication that an undesirable degradative reaction takes place in the gaseous mixture. It is determined that about 14,700 parts by weight of chlorinated hydrocarbon product are produced.

The resulting liquid chlorinated hydrocarbon product contains about 52 percent chlorine by weight and is near water white in color.

When the chlorination reaction is repeated in the absence of the carbon tetrachloride additive, a product impairing degradative reaction occurs in the gaseous mixture in contact with the mass undergoing reaction which involves a reaction of gaseous chlorine and volatilized hydrocarbon.

EXAMPLE XI

To further illustrate the invention 3,770 parts by weight of Representative Hydrocarbon Feed A are blended with 2,030 parts by weight of a normally liquid paraffin hydrocarbon feed as described below and Example I is repeated with the exceptions indicated.

Description of Liquid Paraffin Hydrocarbon Feed Component

| | |
|---|---|
| $C_{10}$ hydrocarbons by weight | 12.3% |
| $C_{11}$ hydrocarbons by weight | 45.3% |
| $C_{12}$ hydrocarbons by weight | 38.1% |
| $C_{13}$ hydrocarbons by weight | 4.3% |
| Average carbon number per molecule | 11.3 |
| Average molecular weight per molecule | 161 |
| Density 60°/60°F. g./ml. | 0.752 |
| Saybolt color | +30 |

The resulting blend is a liquid at room temperature and consists mainly of normal alpha-olefins as described below.

Description of Liquid Hydrocarbon Feed Following Blending

| | |
|---|---|
| Percent normal mono-alpha-olefins by weight | 60.5% |
| Percent diolefins by weight | 2.6% |
| Percent paraffin hydrocarbons by weight | 36.9% |
| $C_5$ hydrocarbons by weight | 1.3% |
| $C_6$ hydrocarbons by weight | 25.4% |
| $C_7$ hydrocarbons by weight | 15.6% |
| $C_8$ hydrocarbons by weight | 11.0% |
| $C_9$ hydrocarbons by weight | 10.4% |
| $C_{10}$ hydrocarbons by weight | 5.6% |
| $C_{11}$ hydrocarbons by weight | 15.8% |
| $C_{12}$ hydrocarbons by weight | 13.3% |
| $C_{13}$ hydrocarbons by weight | 1.6% |
| Average carbon atoms per molecule | 8.6 |
| Average molecular weight per molecule | 121 |
| Density 60°/60°F. g./ml. | 0.727 |
| Saybolt color | +20 |

5,800 parts by weight of the resulting liquid hydrocarbon blend, and 850 parts by weight of carbon tetrachloride are charged to the reaction vessel. Chlorine initially is introduced at a rate of about 250 parts by weight per hour, and subsequently at a rate of about 900 parts by weight per hour. A total of 24,331 parts by weight chlorine are introduced into the reaction vessel over a period of 35 hours. There is no indication that an undesirable degradative reaction takes place in the gaseous mixture. It is determined that about 18,710 parts by weight chlorinated hydrocarbon product are produced.

The resulting liquid chlorinated hydrocarbon product contains about 69 percent chlorine by weight and is near water white in color.

When the chlorination reaction is repeated in the absence of the carbon tetrachloride additive, a product impairing degradative reaction occurs in the gaseous mixture in contact with the mass undergoing reaction which involves a reaction of gaseous chlorine and volatilized hydrocarbon.

Although the invention has been described with preferred embodiments, it is to be understood that variations and modifications may be resorted to as will be apparent to those skilled in the art. Such variations and modifications are to be considered within the purview and the scope of the claims appended hereto.

We claim:

1. An improved process for the production of chlorinated hydrocarbons containing about 20 to 73 percent chlorine by weight comprising chlorinating in the absence of a Lewis acid catalyst a hydrocarbon mixture which is a liquid at room temperature containing on the average 6 to 18 carbon atoms per molecule and consisting mainly of normal alpha-olefins while present in the liquid state at a temperature of about 25° to 120°C. in a reaction zone wherein a gaseous mixture comprising a minor proportion of hydrocarbon vapor and gaseous chlorine exists in contact with said liquid hydrocarbon during at least a portion of the chlorination reaction while providing in said reaction zone about 2 to 20 percent by weight based upon the weight of said hydrocarbon mixture of an additive selected from the group consisting of carbon tetrachloride, chloroform, ethylene dichloride, 1,1,1-trichloroethane, 1,1,2-trichloroethane, and perchloroethane and with no solvent for said hydrocarbon mixture being present in said reaction zone other than said minor concentration of said additive which primarily serves a role other than a solvent and which is at least partially volatilized and present in said gaseous mixture in contact with said liquid hydrocarbon where it serves to eliminate an undesirable reaction between said hydrocarbon vapor and said gaseous chlorine thereby improving the quality of the resulting chlorinated hydrocarbon product, and thereafter substantially removing said additive from said chlorinated hydrocarbon product.

2. An improved process for the production of chlorinated hydrocarbons according to claim 1 wherein said hydrocarbon mixture contains at least 90 percent normal alpha-olefins by weight.

3. An improved process for the production of chlorinated hydrocarbons according to claim 1 wherein said hydrocarbon mixture contains on the average 11 to 14 carbon atoms per molecule.

4. An improved process for the production of chlorinated hydrocarbons according to claim 1 wherein said hydrocarbon mixture during said chlorination is provided at about 70° to 110°C.

5. An improved process for the production of chlorinated hydrocarbons according to claim 1 wherein said additive is present in said reaction zone in a concentration of about 5 to 10 percent by weight based upon the weight of said hydrocarbon mixture.

6. An improved process for the production of chlorinated hydrocarbons according to claim 1 wherein said additive is carbon tetrachloride.

7. An improved process for the production of chlorinated hydrocarbons according to claim 1 wherein said additive is dissolved in said liquid hydrocarbon mixture prior to said chlorination.

8. An improved process for the production of chlorinated hydrocarbons according to claim 1 wherein said additive is under reflux during said chlorination.

9. An improved process for the production of chlorinated hydrocarbons according to claim 1 wherein said resulting chlorinated paraffin hydrocarbon product contains about 40 to 70 percent chlorine by weight.

10. An improved process for the production of chlorinated hydrocarbons containing about 40 to 70 percent chlorine by weight comprising chlorinating in the absence of a Lewis acid catalyst a hydrocarbon mixture which is a liquid at room temperature containing on the average 6 to 18 carbon atoms per molecule and consisting mainly of normal alpha-olefins while present in the liquid state at a temperature of about 25° to 100°C. in a reaction zone wherein a gaseous mixture comprising a minor proportion of hydrocarbon vapor and gaseous chlorine exists in contact with said liquid hydrocarbon during at least a portion of the chlorination reaction while providing in said reaction zone about 5 to 10 percent by weight based upon the weight of said hydrocarbon mixture of carbon tetrachloride additive and with no solvent for said hydrocarbon mixture being present in said reaction zone other than said minor concentration of said additive which primarily serves a role other than a solvent and which is at least partially volatilized and present in said gaseous mixture in contact with said liquid hydrocarbon where it serves to eliminate an undesirable reaction between said hydrocarbon vapor and said gaseous chlorine thereby improving the quality of the resulting chlorinated hydrocarbon product, and thereafter substantially removing said additive from said chlorinated hydrocarbon product.

11. An improved process for the production of chlorinated hydrocarbons according to claim 10 wherein said hydrocarbon mixture contains on the average of 11 to 14 carbon atoms per molecule.

12. An improved process for the production of chlorinated hydrocarbons according to claim 10 wherein said hydrocarbon mixture contains at least 95 percent normal alpha-olefins by weight.

13. An improved process for the production of chlorinated hydrocarbons according to claim 10 wherein said carbon tetrachloride additive is dissolved in said liquid hydrocarbon mixture prior to said chlorination.

14. An improved process for the production of chlorinated hydrocarbons according to claim 10 wherein gaseous chlorine is continuously introduced into said hydrocarbon mixture during said chlorination.

15. An improved process for the production of chlorinated paraffin hydrocarbons according to claim 10 wherein said carbon tetrachloride is under reflux during said chlorination.

* * * * *